US012773666B2

(12) United States Patent
Andrich et al.

(10) Patent No.: US 12,773,666 B2
(45) Date of Patent: Oct. 27, 2026

(54) PROCESS AND APPLIANCE FOR THE PURIFICATION OF A GAS FLOW CONTAINING AT LEAST ONE NITROGEN OXIDE

(71) Applicant: L'Air Liquide, Société Anonyme pour l'Etude et l'Exploitation des Procédés Georges Claude, Paris (FR)

(72) Inventors: Marine Andrich, Jouy-en-Josas, FL (US); Martin Raventos, Paris (FR); Ludovic Granados, Puteaux (FR); Richard Dubettier-Grenier, La Varenne Saint Hilaire (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 661 days.

(21) Appl. No.: 18/195,137

(22) Filed: May 9, 2023

(65) Prior Publication Data

US 2023/0356147 A1 Nov. 9, 2023

(30) Foreign Application Priority Data

May 9, 2022 (FR) ....................................... 2204347

(51) Int. Cl.
*B01D 53/86* (2006.01)
*B01D 3/14* (2006.01)
(Continued)

(52) U.S. Cl.
CPC ........... *B01D 53/8625* (2013.01); *B01D 3/14* (2013.01); *B01D 53/002* (2013.01);
(Continued)

(58) Field of Classification Search
CPC .... B01D 53/8625; B01D 3/14; B01D 53/002; B01D 53/04; B01D 53/047;
(Continued)

(56) References Cited

U.S. PATENT DOCUMENTS 5,362,463 A 11/1994 Stiles et al.
5,525,317 A 6/1996 Bhat et al.
(Continued)

FOREIGN PATENT DOCUMENTS

CN 104307363 1/2015
CN 110385011 10/2019
(Continued)

OTHER PUBLICATIONS

French Search Report for corresponding FR 2204347, Nov. 25, 2022.

*Primary Examiner* — Frank M Lawrence, Jr.
(74) *Attorney, Agent, or Firm* — Allen E. White; Elwood L. Haynes

(57) ABSTRACT

In a process for the purification of a gas flow containing $NO_2$, carbon dioxide and nitrogen, the gas flow is purified by adsorption in order to produce a flow enriched in carbon dioxide and in $NO_x$ and depleted in nitrogen, the flow enriched in carbon dioxide and in $NO_x$ and depleted in nitrogen is treated in a treatment unit in order to form a fluid enriched in $NO_2$ with respect to the treated flow, the fluid enriched in $NO_2$ is sent to a catalytic conversion unit making possible the conversion of at least a portion of the $NO_2$, in the presence of oxygen and also of ammonia or of urea, to give nitrogen and water in order to produce a gas depleted in $NO_2$ with respect to the fluid enriched in $NO_2$, the catalytic conversion unit also being fed with a fluid having nitrogen as main component.

12 Claims, 5 Drawing Sheets

(51) Int. Cl.

*B01D 53/00* (2006.01)
*B01D 53/047* (2006.01)
*B01D 53/56* (2006.01)

(52) U.S. Cl.

CPC ...... *B01D 53/047* (2013.01); *B01D 2251/102* (2013.01); *B01D 2251/2062* (2013.01); *B01D 2251/2067* (2013.01); *B01D 2257/102* (2013.01); *B01D 2257/404* (2013.01); *B01D 2258/0283* (2013.01)

(58) Field of Classification Search

CPC ...... B01D 2251/102; B01D 2251/2062; B01D 2251/2067; B01D 2257/102; B01D 2257/404; B01D 2258/0283; B01D 53/56; B01D 53/75; B01D 53/8696; B01D 2258/02; F25J 3/0266; F25J 3/067; F25J 2205/32; F25J 2205/40; F25J 2205/64; F25J 2205/82; F25J 2210/04; F25J 2220/82; F25J 2230/30; F25J 2220/84; F25J 2245/02

USPC ............ 95/96, 130, 236; 423/220, 228, 229, 423/239.1, 400, 402; 62/600, 617

See application file for complete search history.

(56) References Cited

U.S. PATENT DOCUMENTS

| | | | | |
|---|---|---|---|---|
| 10,518,212 | B2 * | 12/2019 | Stallmann | F23C 99/00 |
| 2003/0077212 | A1 * | 4/2003 | Hammer | F01N 3/0892<br>423/239.1 |
| 2011/0239629 | A1 * | 10/2011 | Tanoura | F01N 3/2013<br>60/276 |
| 2019/0284052 | A1 * | 9/2019 | Ostuni | C01B 21/26 |

FOREIGN PATENT DOCUMENTS

| | | |
|---|---|---|
| EP | 3 145 606 | 8/2018 |
| EP | 2 176 165 | 7/2019 |

* cited by examiner

PROCESS AND APPLIANCE FOR THE PURIFICATION OF A GAS FLOW CONTAINING AT LEAST ONE NITROGEN OXIDE

CROSS REFERENCE TO RELATED APPLICATIONS

This application claims the benefit of priority under 35 U.S.C. § 119 (a) and (b) to French Patent Application No. 2204347, filed May 9, 2022, the entire contents of which are incorporated herein by reference.

BACKGROUND

The present invention relates to a process for the purification of a gas flow comprising at least one nitrogen oxide, for example nitrogen monoxide NO and/or $NO_2$, by a purification unit with conversion of $NO_2$ over a catalytic bed.

Nitrogen oxides (which comprise $NO_x$ compounds) are pollutants commonly emitted during the combustion of fossil fuels. $NO_x$ compounds in the atmosphere create tropospheric ozone, which is toxic when it is inhaled and contributes to the greenhouse effect. Furthermore, $NO_x$ compounds contribute to the formation of acid rain, which is harmful to plant and animal life, and also to goods. During treatment and purification stages in the presence of water, in particular compression (followed by refrigeration), $NO_x$ compounds will generate acid condensates, in particular nitric acid and nitrous acid.

It is thus preferable to employ a process for scrubbing flue gases which makes it possible to cool them before compressing them, and also to remove a portion of the dust which they contain. If the scrubbing is at high pressure, the conversion of NO to $NO_2$ is accelerated.

The nitrogen oxides can be halted by using:

- a low-pressure scrubbing column, with or without chemical additive, or
- an aqueous scrubbing column, preferably under pressure, or
- low-temperature separation, by distilling and/or by partially condensing the combustion flue gases rich in $CO_2$ comprising nitrogen oxides ($NO_x$), where the nitrogen oxides for which the oxidation is greater than that of NO are separated from the flue gases. An example of such a process is given in EP 3 145 606 A1.

An SCR (Selective Catalytic Reduction) makes it possible to convert a portion of the $NO_x$ compounds (NO and $NO_2$) into $N_2$ and $H_2O$ by reacting them with ammonia or urea in contact with a catalyst at approximately 200-400° C. The passage section of the SCR reactor, the volume of the catalytic reactor and the amount of catalyst depend on the volume flow rate to be treated. Furthermore, the catalyst has a lifetime of the order of 3-5 years (requires replacement every 3-5 years). The cost (CapEx) of an SCR and also its size thus depend on the volume flow rate to be treated.

According to the SCR process, the gas containing $NO_x$ compounds mixed for example with ammonia subsequently passes through a multi-bed catalyst in a range of temperatures of between 250 and 380° C. The catalysts most often used are metal oxides on a $TiO_2$ or $Al_2O_3$ support.

An example of gas flow to be treated is the gas generated by the heating furnace of a unit for the steam reforming of hydrocarbons, for example the reforming of methane in the presence of steam, known as Steam Methane Reforming or SMR. This reforming makes possible the production of hydrogen, an energy carrier which plays an increasing role in the decarbonization of various sectors, in particular transport and industry. In SMRs, hydrogen production is accompanied by significant $CO_2$ production. A $CO_2$ capture unit can be added to an SMR in order to reduce the carbon footprint of the production of hydrogen by SMR. $CO_2$ capture (for example, purification of $CO_2$ for food use or for sequestration) can be carried out cryogenically or non-cryogenically. $CO_2$ is transported and sequestered, if need be, either under pressure or in liquid form.

On an SMR, the $CO_2$ capture unit can be placed on the waste gases from a PSA which treats the product from the SMR or on the flue gases from the furnace, produced by the process for the production of heat necessary for the chemical reaction of the reforming. The advantage of $CO_2$ capture on the flue gases is that this makes it possible to capture up to 100% (probably >80%) of the $CO_2$ from the SMR. The $CO_2$ originates from the reforming reaction of the methane if the waste gas from the PSA is recycled to the burners of the furnace and originates from the combustion of the gases in the burners of the SMR in order to maintain a high temperature in the furnace.

The SCRs are generally placed downstream of combustion units on low-pressure flue gases. For example, on some SMRs, SCRs are placed between the combustion furnace and the chimney for discharges of the flue gases to the atmosphere.

FIG. 1 illustrates a selective catalytic reduction SCR unit, fed with a mixture of ammonia NH3 and air, for treating a gas flow F containing carbon dioxide, nitrogen and $NO_2$. In order to limit the energy consumption necessary to raise in temperature the incoming stream F of the SCR downstream of the unit for concentrating in NON, an economizing exchanger E can be added in order to recover a portion of the heat of the products P of the SCR, preheating the incoming stream. The contribution of heat to compensate for the heat losses and the exergetic loss in the economizer is ensured with a backup heater T (for example, electrical or gas or steam, called trim heater).

Alternatively, the supply of heat can also be ensured by thermal incorporation with the remainder of the process, such as, for example, with the hot flue gases from the combustion unit.

EP 2 176 165 A1 relates to the recycling of a stream enriched in $NO_2$ upstream of a separation unit (and downstream of an existing SCR) which produces a stream enriched in $CO_2$, a stream depleted in $CO_2$ (non-condensables) and a stream enriched in $NO_2$.

SUMMARY

The present invention relates to an SCR placed not downstream of a combustion unit on low-pressure flue gases but on a stream preconcentrated in $NO_2$ by virtue of one or more separation processes upstream of the SCR which are placed in series or in parallel so that the flow to be treated is lower. The advantage of such a solution is that of significantly reducing the CapEx of the SCR, it being possible for the flow of the flue gases to be treated to be 100 times greater than the flow entering the SCR. One of the disadvantages is that the temperature of the flue gases (~200-400° C. necessary for the SCR) is then no longer inevitably available at the inlet of the SCR. Furthermore, the fact of concentrating in $NO_2$ the stream to be treated in the SCR can also result in this stream being concentrated in certain impurities at the inlet of the SCR (for example $SO_2$).

More specifically, the unit for concentrating in $NO_2$ upstream of the SCR might advantageously be a concentrator, such as a PSA unit or membranes, or a distillation column operated at a temperature below ambient temperature (for example advantageously over a temperature range between [−40; 10]° C. and a fluid at the inlet of the distillation column comprising >50 mol % of $CO_2$ and <50 mol % of $N_2$).

Furthermore, the stream preconcentrated in $NO_2$ at the outlet of the unit for concentrating in NO can predominantly comprise $CO_2$ (concentration range [50; 99.5] mol %) and nitrogen (concentration range [0.5; 50] mol %).

The fact of having to heat the inlet fluid in the SCR also has the advantage of being able to choose and regulate the reaction temperature of the SCR, which is an important parameter which influences the chemical reactions taking place in the SCR. In the normal application of SCRs, the temperature of the flue gases is endured and not regulated.

Furthermore, in order to limit the emissions of $CO_2$ and of $NH_3$ (originating from the $NH_3$ which passes into the SCR without reacting) to the atmosphere, the products of the SCR can be recycled in the process (recycle fluidically connected to the unit for concentrating in $NO_2$ upstream of the SCR with, between the two, other possible unit operations, such as a means for compressing and a unit for drying the fluid).

As mentioned, the unit for concentrating in $NO_2$ can also concentrate in other impurities, such as $SO_x$ compounds (in particular $SO_2$). If such is the case, there is a risk of the $SO_x$ compounds reacting with the $NH_3$ to form in particular ammonium bisulfate (ABS) in the SCR, which risks fouling and corroding the catalyst and the economizer.

In order to limit the risks of formation of ABS, it is proposed, according to the invention, to dilute the inlet stream of the SCR with another fluid (such as residual nitrogen) (even if this brings about an increase in the inlet volume flow rate in the SCR).

This dilution flow can also make it possible to ensure a constant flow at the inlet of the SCR despite a potential variation in the flow exiting from the unit for concentrating in $NO_2$ and/or to contribute necessary constituents to the SCR, such as molecular oxygen (for example: distillation column, the liquid outlet flow of which depends on the liquid reflux at the column top).

It thus becomes possible to reduce or to prevent the flow of air which has to be sent to the SCR with the ammonia.

It is also advantageous to use the dilution flow even in the absence of $SO_x$ in order to be able to adjust the concentration and/or the flow and/or the temperature of the gas feeding the SCR.

According to a subject-matter of the invention, provision is made for a process for the purification of a gas flow containing NO and/or $NO_2$, carbon dioxide and nitrogen, in which:

i) the gas flow is purified by adsorption in order to produce a flow enriched in carbon dioxide and in $NO_x$ and depleted in nitrogen and a fluid depleted in carbon dioxide and in $NO_x$ and enriched in nitrogen, ii) the flow enriched in carbon dioxide and in $NO_x$ and depleted in nitrogen is treated in a treatment unit in order to form a fluid enriched in $NO_2$ with respect to the treated flow, iii) the fluid enriched in $NO_2$ is sent to a catalytic conversion unit which makes possible the conversion of at least a portion of the $NO_2$, in the presence of oxygen and also of ammonia or of urea, to give nitrogen and to give water in order to produce a gas depleted in $NO_2$ with respect to the fluid enriched in $NO_2$, the catalytic conversion unit also being fed with a fluid having nitrogen as main component consisting of:

at least a portion of the fluid depleted in carbon dioxide and in $NO_2$ and enriched in nitrogen of stage i) and/or a fluid at a pressure greater than the pressure of the fluid at the inlet of the catalytic conversion unit, obtained by treating at least a portion of the gas stream or of a and/or of an air separation unit or of a network.

According to other optional aspects of the invention:

- the fluid enriched in $NO_2$ is heated upstream of the catalytic conversion unit,
- the fluid enriched in $NO_2$ is heated upstream of the catalytic conversion unit by heat exchange with the gas depleted in $NO_2$,
- the gas flow is a flow of combustion flue gases,
- the combustion flue gases originate in part from a furnace for the reforming of a hydrocarbon, for example with steam,
- at least a part of the gas depleted in $NO_2$ produced by the catalytic conversion unit is sent to be mixed with the gas flow upstream of the adsorption, for example by sending it to a tower for scrubbing the gas flow,
- the treatment unit produces, in addition to the fluid enriched in $NO_2$, a product depleted in $NO_2$ and enriched in $CO_2$, this product preferably containing at least 80 mol % of $CO_2$,
- the treatment unit comprises an appliance for separation by partial condensation and/or by distillation fed at a temperature of less than 0° C., indeed even than −10° C.,
- the gas flow contains SON,
- the flow rate of the fluid having nitrogen as main component, for example fluid depleted in carbon dioxide and in $NO_2$ and enriched in nitrogen, sent to the catalytic conversion unit, is varied as a function of the composition and/or of the temperature and/or of the flow rate of the fluid enriched in $NO_2$ sent to the catalytic conversion unit,
- a portion of the flow of the fluid depleted in carbon dioxide and in $NO_2$ and enriched in nitrogen is sent to another entity and/or to the air,
- the gas flow is treated by scrubbing with water or with an alkaline solution, such as NaOH or $Na_2CO_3$, upstream of stage i),
- the fluid having nitrogen as main component, for example the fluid depleted in carbon dioxide and in $NO_2$ and enriched in nitrogen, contains at least 90 mol % of nitrogen, indeed even at least 95 mol % of nitrogen, and preferably at least 1 mol % of oxygen, indeed even at least 2 mol % of oxygen,
- the fluid enriched in $NO_2$ is heated upstream of the catalytic conversion unit by heat exchange with the gas depleted in $NO_2$.

According to another subject-matter of the invention, provision is made for an appliance for the purification of a gas flow containing $NO_2$, carbon dioxide and nitrogen comprising a unit for purification by adsorption, a treatment unit, a unit for the catalytic conversion of $NO_2$, means for sending the gas flow to the unit for purification by adsorption in order to be separated therein into a flow enriched in carbon dioxide and in $NO_2$ and depleted in nitrogen and into a fluid depleted in carbon dioxide and in $NO_2$ and enriched in nitrogen, means for sending the flow enriched in carbon dioxide and in $NO_2$ and depleted in nitrogen to the treatment unit in order to form a fluid enriched in $NO_2$ with respect to the treated flow, means for sending the fluid enriched in $NO_2$ to the catalytic conversion unit making possible the conversion of at least a portion of the $NO_2$ in the presence of ammonia and of oxygen to give nitrogen and water in order to produce a gas depleted in $NO_2$ with respect to the fluid enriched in $NO_2$ and means for sending at least from time to time a fluid having nitrogen as main component, for example at least a portion of the fluid depleted in carbon dioxide and in $NO_2$ and enriched in nitrogen, to the catalytic conversion unit.

The treatment unit can comprise a distillation column for producing the fluid enriched in $NO_2$ with respect to the treated flow and a gas depleted in $NO_2$ and means for separating the gas depleted in $NO_2$ in order to form a fluid rich in carbon dioxide.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
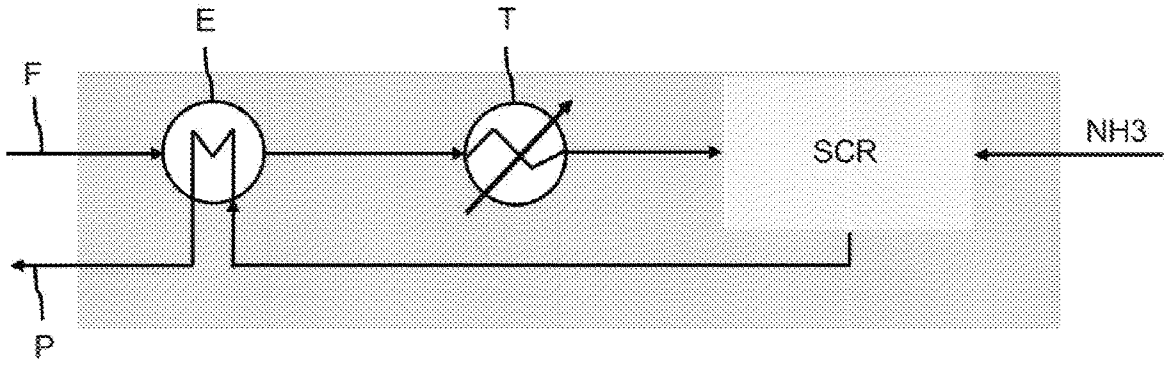
Fig. 1 Prior Art
FIG. 1 illustrates a selective catalytic reduction SCR unit as known in the art.
Figure 2:
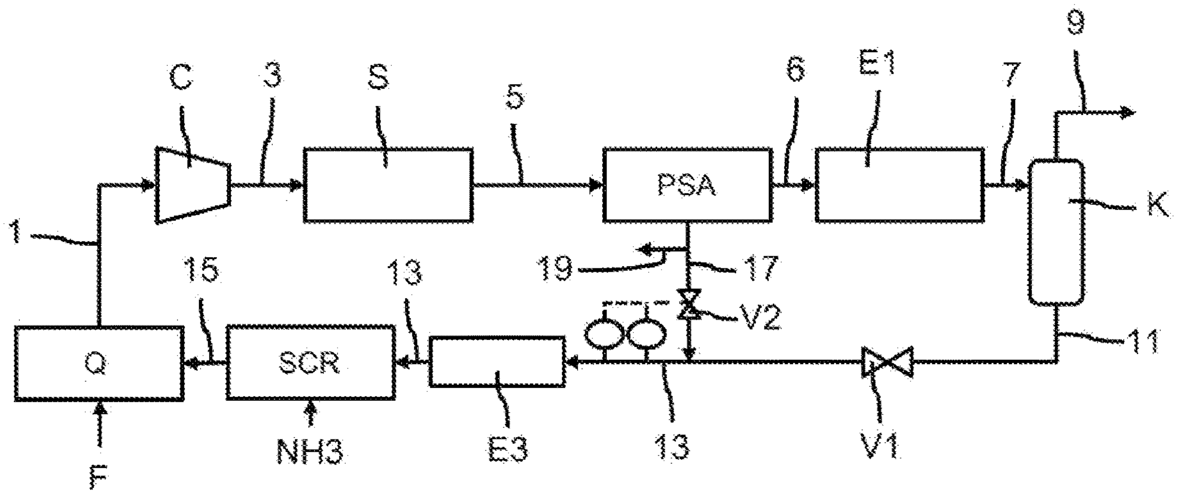
FIG. 2 illustrates a process according to the invention.

FIG. 2 illustrates a process for the purification of a gas flow F comprising $NO_2$. The flow F is a gas flow forming part of the flue gases from a heating furnace of a unit for the reforming of a hydrocarbon to produce a gas containing hydrogen, for example steam methane reforming.

The flow F contains carbon dioxide, nitrogen and NO and/or $NO_2$, and also optionally at least one of the following components: $N_2O$, SON, oxygen, argon. Typically, it does not contain hydrogen or methane, indeed even only possibly traces. The oxidation of NO, when present, to $NO_2$ can take place little by little during all the parts of the process where oxygen and NO are present in the gas phase. The rate of oxidation is higher at high pressures and low temperatures. The oxidation is catalysed by adsorbents, such as those present in the dryer and the PSA.

This gas F is produced at high temperature and thus is cooled by scrubbing with water in a scrubbing tower Q to produce a cooled gas 1. The cooled gas 1 is compressed by a compressor C to between 5 and 15 bar abs and subsequently is dried in a dryer S, for example by adsorption, to produce a dry gas 5. The dry gas 5 is sent to a pressure swing adsorption PSA unit comprising several adsorbers operating in offset fashion in a known way. The PSA produces a flow 6 enriched in carbon dioxide and in $NO_2$ and depleted in nitrogen and a fluid 17, 19 depleted in carbon dioxide and in $NO_2$ and enriched in nitrogen; the fluid 17, 19 possibly contains oxygen.

The flow 6 is cooled in a heat exchanger E1 to a temperature which makes possible the liquefaction of the $NO_2$ in the flow 6, producing a cooled fluid 7 which is separated by distillation and/or partial condensation. There is seen here a distillation column K producing a flow 9 depleted in $NO_2$ and a bottom liquid 11 enriched in $NO_2$. The liquid 11 is vaporized (not illustrated) to produce a gas which is expanded in a valve V1 and sent as gas 13 to be treated in the selective catalytic reduction SCR unit after heating in the heat exchanger E3.

The SCR reduction unit is fed with ammonia and/or with urea and also by a source of oxygen, for example air, if the gas 13 does not comprise enough oxygen. An injection of air may, however, be necessary to atomize the ammonia or the urea. The SCR unit produces a gas 15 in which the $NO_2$ has been partially converted into nitrogen and into water. This gas 15 is sent to the scrubbing tower to recover the carbon dioxide which it contains. This also makes it possible to prevent sending ammonia to the atmosphere.

At least a portion 17 of the gas depleted in carbon dioxide and in $NO_2$ and enriched in nitrogen can be mixed with the gas 11 to form the gas 13. The valve V2 regulates the amount of gas 17 mixed with the gas 11, this valve being controlled by an FIC, in order to detect the flow rate of the fluid 13, and/or by an AIC, in order to detect the content of a component of the fluid 13.

Another portion 19 of the gas depleted in carbon dioxide and in $NO_2$ and enriched in nitrogen can be sent to the atmosphere.

The gas 17 is richer in nitrogen than the vaporized liquid 11 and thus makes it possible to enrich the vaporized liquid 11 in nitrogen. The gas 17 is also richer in oxygen than the vaporized liquid 11 and makes it possible to enrich the gas 11 in oxygen in order to reduce the amount of oxygen to be sent to the SCR unit from another source, if need be.

Nitrogen has the advantage of being a neutral gas which does not influence the reaction mechanisms in the reaction chamber of the SCR (unlike air, which contains $O_2$).

If the gas 5 contains at least one SON, there is a risk of the $SO_x$ being present in the gas 13, indeed even of being enriched by the upstream treatments. There is thus a danger of at least one $SO_x$ (in particular $SO_2$) reacting with the $NH_3$ to form in particular ammonium bisulfate $(NH_4)HSO_4$ (ABS), which risks fouling and corroding the catalyst of the SCR unit. In order to limit the risks of formation of ABS, the inlet stream 13 of the SCR unit is diluted with the fluid 17 rich in nitrogen, preferably containing at least 90 mol %, indeed even at least 95 mol %, of nitrogen and preferably at least 1 mol % of oxygen, indeed even at least 2 mol % of oxygen. This can result in an increase in the inlet volume flow rate in the SCR unit.

This dilution flow 17 can also make it possible to ensure a constant flow at the inlet of the SCR despite a potential variation in the flow 11 exiting from the unit for concentrating in $NO_x$ and/or to contribute necessary constituents to the SCR unit, such as molecular oxygen and/or water. For example, the distillation column K has a liquid outlet flow 11 which depends on the liquid reflux at the column top and the flow 11 is thus variable.

ABS cannot be prevented from forming if the SCR unit is not operated at a sufficiently high temperature. Thus, to remove the ABS formed, the temperature has to be increased up to 300-350° C., the reaction for the formation of ABS being reversible.

The flow 17 can be varied in order to target a set flow (over a certain range of variation) entering the SCR unit. Thus, if the flow 11 falls, the flow 17 increases, and vice versa.

It will also be understood that, according to alternative forms of the invention, the flow 17 added to the flow 11 can be a gas having, as main component, nitrogen originating from a source other than the PSA unit. It can originate from another unit treating the cooled gas 1 and/or from a network, for example a pipeline transporting nitrogen and/or an appliance for air separation, for example by cryogenic distillation. Alternatively, the flow 17 can be varied in order to target a given composition.

For example, it is possible to target a given ratio between the $CO_2$ content and the nitrogen content of the flow 13. It is possible to target a given oxygen content of the flow 13 or a given content of impurities, such as $SO_2$. The addition of water to the flow 11 makes it possible to reduce the formation of compounds. This is because water acts as inhibitor for some undesirable chemical reactions taking place in the SCR unit. In practice, air is often added to the inlet flow 13 if there is a need to increase the 02 concentration or to more easily atomize the ammonia in the injector. The process comprises the addition of ammonia or of urea to the SCR unit upstream of the reaction chamber (the concentration of aqueous phase of which can potentially be adjusted as a function of the need for water).

The dilution flow can be characterized in the following way:

- molar concentration of nitrogen >80%, preferably >90%, and/or
- flow of flow 17 chosen so as to obtain a concentration of $N_2$>20% at the inlet of the SCR unit, and/or
- flow of the flow 17 constituting between 10% and 70% of the molar flow 11, for example in certain stabilized operating cases and during transitory phases, and/or
- flow of the flow 17 so as to obtain a concentration of $SO_2$<5 molar ppm at the inlet of the SCR unit, and/or
- flow of the flow 17 so as to obtain a concentration of $O_2$>1.5 molar % at the inlet of the SCR unit.

To recycle the product 15 of the SCR unit in the process is counter-intuitive for a person skilled in the art with regard to the management of the $NO_x$ compounds. Generally, the product of the SCR is directly sent to the atmosphere (SCR placed immediately before the chimney/silencer to reduce the $NO_x$ compounds sent to the atmosphere).

Figure 3:
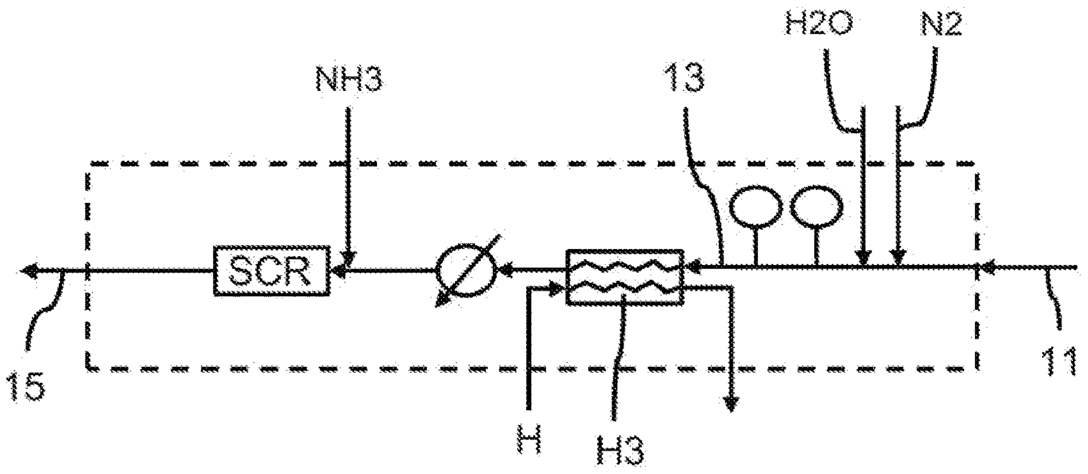
FIG. 3 illustrates a detail of a process according to the invention.

FIG. 3 shows the heating of a heat exchanger H3 upstream of the SCR unit by means of a heat generator H. It should be noted that water and/or nitrogen are added upstream of the FIC and AIC.

Figure 4:
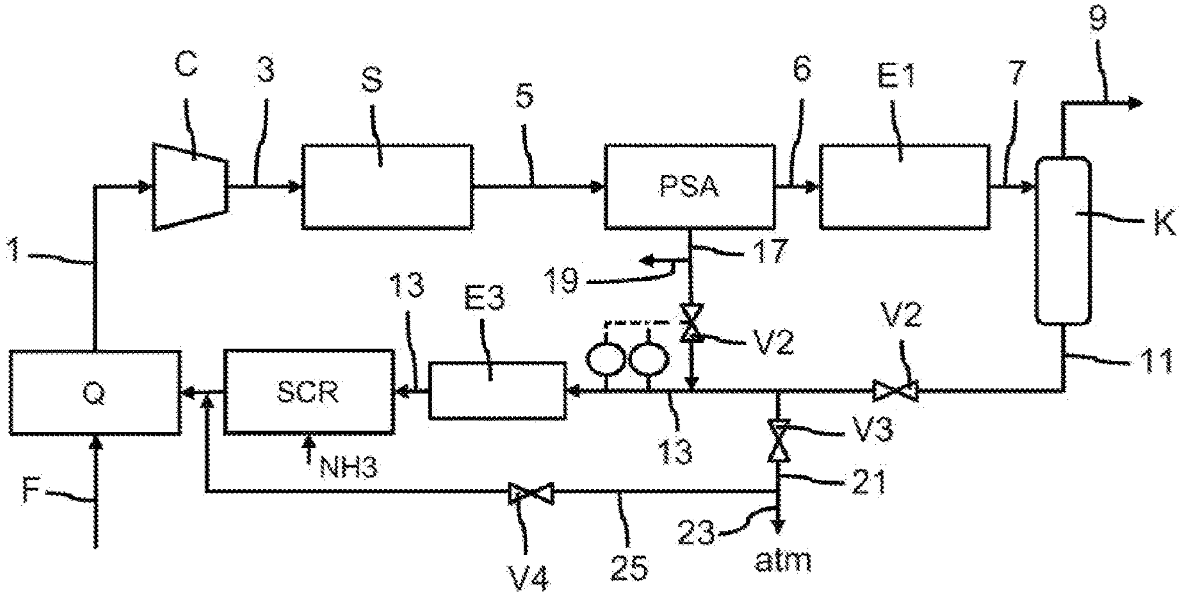
FIG. 4 illustrates a process according to the invention.

FIG. 4 shows an alternative form of FIG. 2 in which, in order to limit the installed power of the heater E3 upstream of the SCR unit, a portion 25 of the stream 11 entering the SCR unit can bypass the SCR unit (being returned downstream of the SCR to rejoin the flow 15) or, as flow 23, be sent to the atmosphere during the phases of regeneration of the ABS (~a few hours once or twice per year). Furthermore, a loop or a bypass is to be provided in order to make it possible to regenerate the economizer. The valves V3 on the flow 21, from which are divided the flows 23 and 25, and V4 on the flow 25 make it possible to regulate the amounts of gas sent to the air or downstream of the SCR unit.

Figure 5:
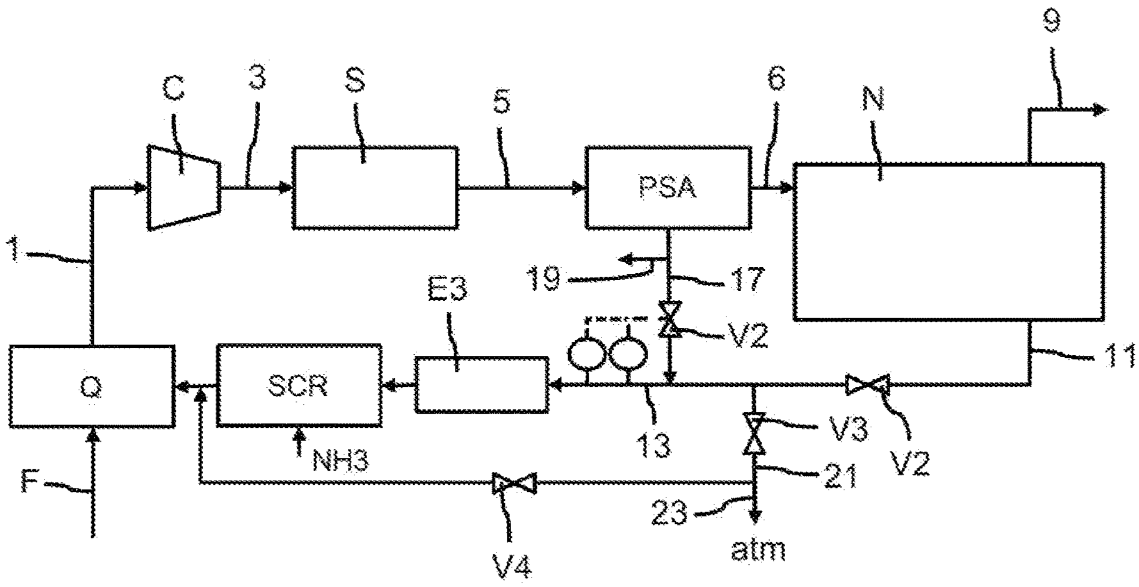
FIG. 5 illustrates a process according to the invention.

FIG. 5 shows an alternative form of FIG. 4 in which the unit for separation of $NO_x$ N produces a flow depleted in $NO_2$ 9 and a flow enriched in $NO_2$ 11 but does not necessarily involve a low-temperature separation, for example a partial condensation or distillation. Any known way of separation of $NO_2$ can be envisaged, for example by adsorption on a molecular sieve.

In this Figure, the flows 21, 23 are not necessarily present.

Figure 6:
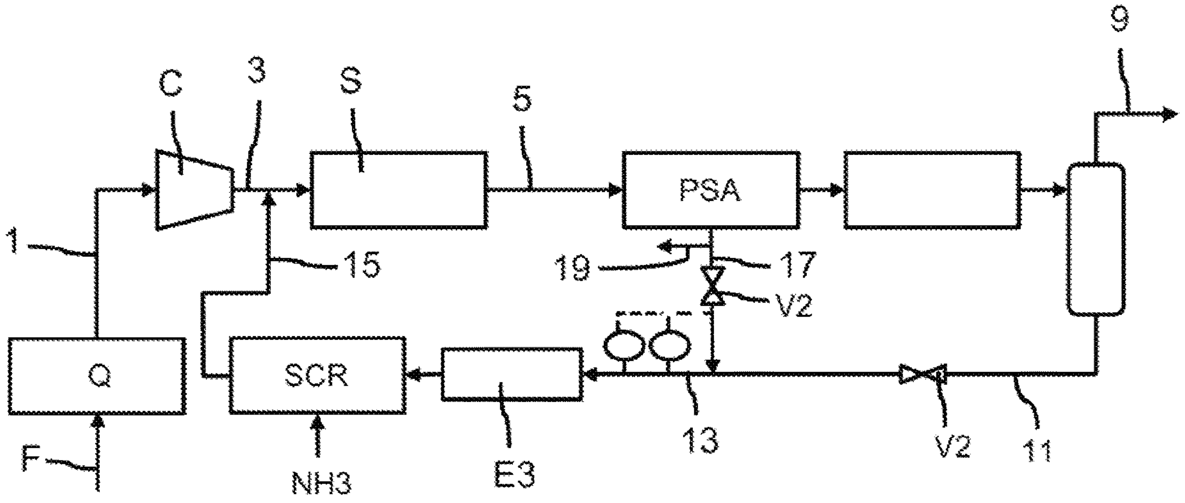
FIG. 6 illustrates a process according to the invention.

FIG. 6 shows an alternative form of FIG. 2 in which the SCR unit operates at a pressure between 4 and 10 bar abs, compatible with the outlet pressure or with an intermediate pressure of the compressor C. In this case, the gas 15 produced by the SCR unit is sent downstream of the compressor C or to an intermediate stage of compression of this compressor, so that the nitrogen and the carbon dioxide which the gas 15 contains are recycled.

If the SCR unit operates under pressure (typically at a pressure slightly greater than that of the dryers), this makes it possible to reduce the size of the item of equipment and to improve the specific energy by directly recycling, under pressure, the gas 15 produced by this SCR unit upstream of the dryers S.

The flow 15 can be recycled downstream of the compressor C. In this case, the flow 17 has to be compressed upstream of the inlet of the SCR unit.

Otherwise, the flow 15 can be recycled in an inter-stage of the compressor C and, in this case, the flow 17 can be sent to the inlet of the SCR unit without compressing it.

Figure 7:
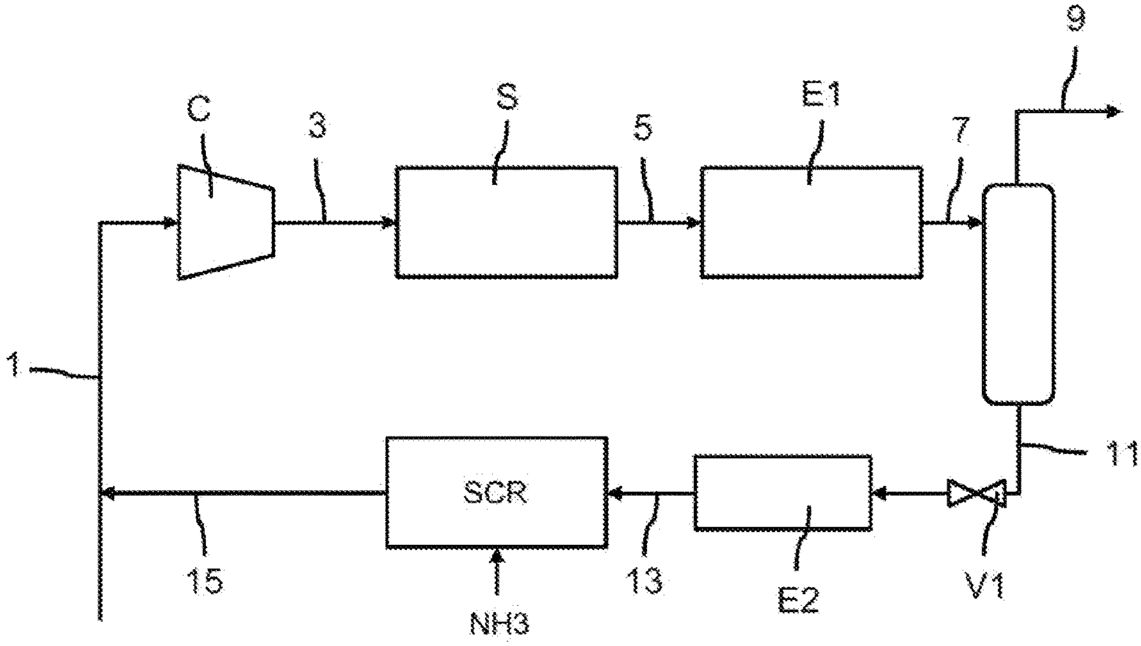
FIG. 7 illustrates a comparative process.

FIG. 7 shows a comparative version of FIG. 2 without the unit for separation of nitrogen by adsorption.

Figure 8:
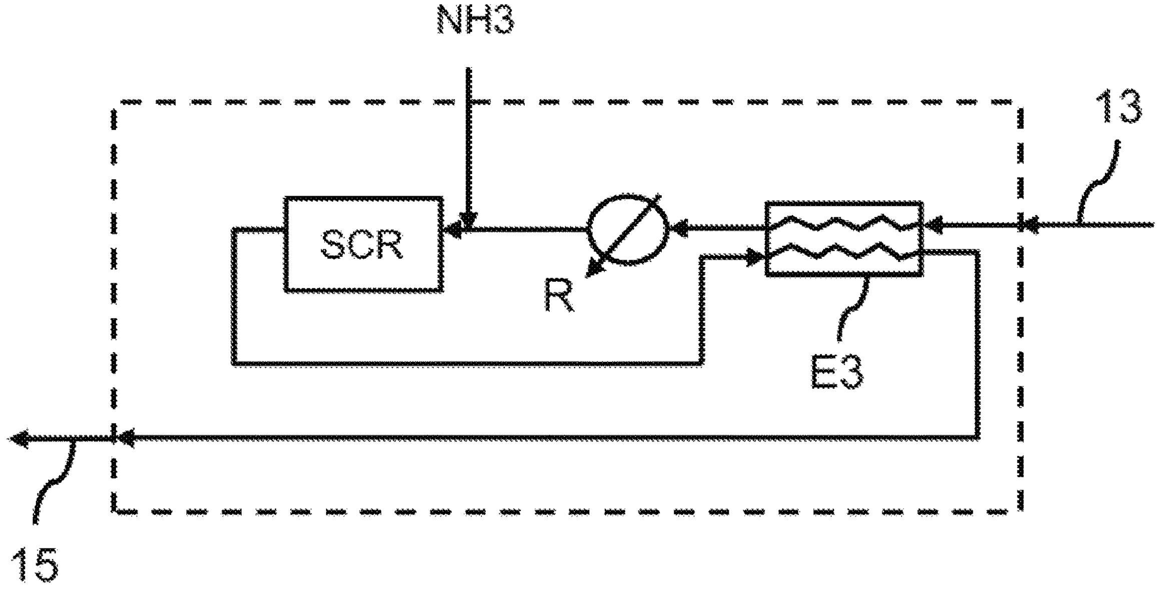
FIG. 8 illustrates a detail of a process according to the invention.

FIG. 8 illustrates a detail of a process according to the invention showing the heater R for regulating the inlet temperature of the SCR. The gas 13 is a mixture of the fluid enriched in $NO_2$ 11 and the fluid 17 depleted in carbon dioxide and in $NO_2$ and enriched in nitrogen. It is first heated in a heat exchanger E3 by indirect heat exchange. The heated gas is subsequently heated by the heater and mixed with the ammonia to reach the temperature required for the SCR unit. The gas 15 produced is hot and is used to heat the exchanger E3 before being sent to the tower Q.

Figure 9:
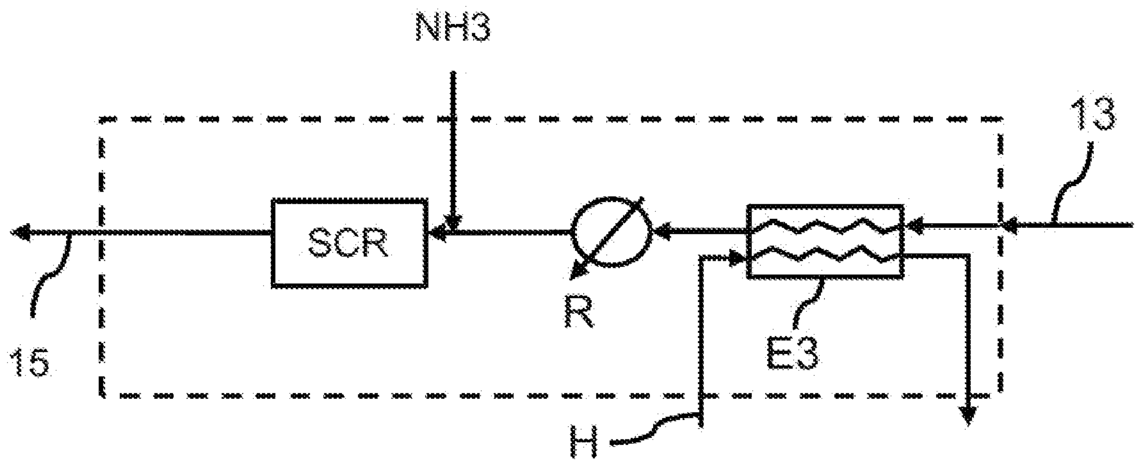
FIG. 9 illustrates a detail of a process according to the invention.

FIG. 9 is an alternative form of FIG. 8 where the exchanger E3 is heated by a calorigenic gas H.

Figure 10:
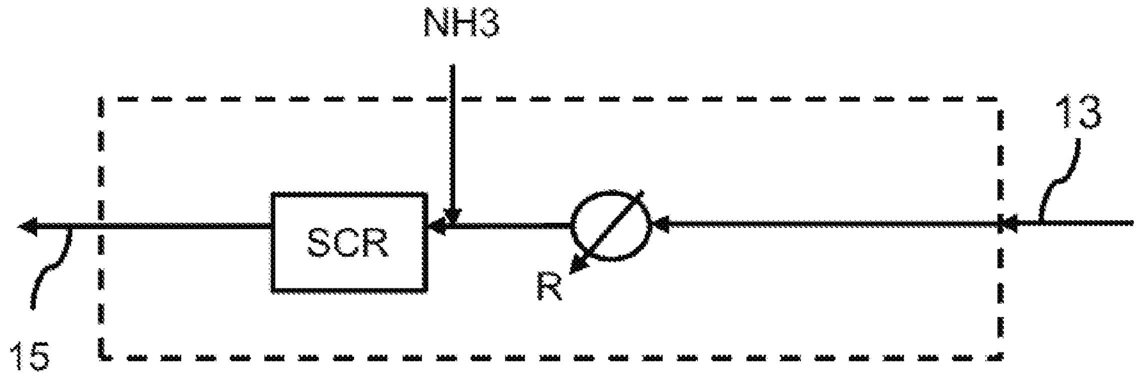
FIG. 10 illustrates a detail of a process according to the invention.

FIG. 10 illustrates the case where the gas 13 is heated solely by the heater R.

In all the cases mentioned, the SCR unit can be incorporated in a unit for the production of a flow rich in $CO_2$, for example by partial condensation and/or distillation. The flow 9 depleted in $NO_2$ can be treated by partial condensation and/or distillation in a system of columns for producing at least one fluid rich in $CO_2$, for example containing at least 90 mol % of $CO_2$. Preferably, the flow 9 is not heated but is sent directly to the partial condensation and/or to the distillation. Downstream of this cold separation, the majority of the NO, if present, will have been converted to $NO_2$, which coexists with $N_2O_4$.

In order to concentrate the flow to be treated in $NO_2$, a bottom reboiler of the distillation column K can be added (optionally) upstream of the SCR unit or the inlet temperature of the fluid 7 in the distillation column K can be adjusted so as to obtain a certain flow or a certain concentration at the outlet of the distillation column K.

In order to prevent problems of corrosion in the economizer, the materials (for example stainless steels, and the like) will be carefully chosen.

Use may also alternatively be made of less noble materials for this economizer by regulating the outlet temperature of the fluid which has reacted and by making sure that it remains above its dew point. For this, a heater will also be provided upstream of the economizer on the fluid to be treated.

Preferably, the low-temperature separation of the $NO_2$ in the units K or N takes place in the same thermally insulated chamber as the separation of the fluid depleted in $NO_2$ produced by the separation of the $NO_2$ to produce a fluid containing at least 90% of $CO_2$.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for the purification of a gas flow containing NO and/or $NO_2$, carbon dioxide and nitrogen, comprising:

i) purifying a gas flow by adsorption thereby producing a flow enriched in carbon dioxide and in $NO_x$ and depleted in nitrogen and a fluid depleted in carbon dioxide and in $NO_x$ and enriched in nitrogen, ii) treating the flow enriched in carbon dioxide and in $NO_x$ and depleted in nitrogen in a treatment unit thereby forming a fluid enriched in $NO_2$ with respect to the treated flow, iii) sending the fluid enriched in $NO_2$ to a catalytic conversion unit thereby converting at least a portion of the $NO_2$, in the presence of oxygen and ammonia or of urea, thus providing nitrogen and water in order to produce a gas depleted in $NO_2$ with respect to the fluid enriched in $NO_2$, the catalytic conversion unit also being fed with a fluid having nitrogen as main component consisting of:

at least a portion of the fluid depleted in carbon dioxide and in $NO_2$ and enriched in nitrogen of stage i) and/or a fluid at a pressure greater than the pressure of the fluid at the inlet of the catalytic conversion unit, obtained by treating at least a portion of the gas stream or of a and/or fluid originating from an air separation unit or of a network.

2. The process according to claim 1, in which the gas flow is a flow of combustion flue gases.

3. The process according to claim 2, in which the combustion flue gases originates in part from a furnace for the reforming of a hydrocarbon.

4. The process according to claim 1, wherein at least a part of the gas depleted in $NO_2$ produced by the catalytic conversion unit is sent to be mixed with the gas flow upstream of the adsorption.

5. The process according to claim 1, wherein the treatment unit produces, in addition to the fluid enriched in $NO_2$, a product depleted in $NO_2$ and enriched in $CO_2$.

6. The process according to claim 1, wherein the treatment unit further comprises an appliance for separation by partial condensation and/or by distillation fed at a temperature of less than 0° C.

7. The process according to claim 1, wherein the gas flow contains $SO_x$.

8. The process according to claim 1, wherein the flow rate of the fluid having nitrogen as main component sent to the catalytic conversion unit, is varied as a function of the composition and/or of the temperature and/or of the flow rate of the fluid enriched in $NO_2$ sent to the catalytic conversion unit.

9. The process according to claim 1, wherein a portion of the flow of the fluid depleted in carbon dioxide and in $NO_2$ and enriched in nitrogen is sent to another entity and/or to the air.

10. The process according to claim 1, wherein the gas stream is treated by scrubbing with water or with an alkaline solution upstream of stage i).

11. The process according to claim 1, wherein the fluid having nitrogen as main component contains at least 90 mol % of nitrogen.

12. The process according to claim 1, wherein the fluid enriched in $NO_2$ is heated upstream of the catalytic conversion unit by heat exchange with the gas depleted in $NO_2$.

* * * * *